United States Patent
Hori et al.

(10) Patent No.: US 10,305,113 B2
(45) Date of Patent: *May 28, 2019

(54) METHOD FOR PRODUCING CORE-SHELL CATALYST

(71) Applicant: TOYOTA JIDOSHA KABUSHIKI KAISHA, Toyota-shi, Aichi-ken (JP)

(72) Inventors: Yoshihiro Hori, Nisshin (JP); Shotaro Ishikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/329,057

(22) PCT Filed: Jun. 3, 2015

(86) PCT No.: PCT/JP2015/065993
§ 371 (c)(1),
(2) Date: Jan. 25, 2017

(87) PCT Pub. No.: WO2016/017268
PCT Pub. Date: Feb. 4, 2016

(65) Prior Publication Data
US 2017/0229713 A1    Aug. 10, 2017

(30) Foreign Application Priority Data
Jul. 31, 2014  (JP) .................................. 2014-156238

(51) Int. Cl.
*H01M 4/88* (2006.01)
*H01M 4/86* (2006.01)
(Continued)

(52) U.S. Cl.
CPC .......... *H01M 4/8657* (2013.01); *B01J 23/44* (2013.01); *B01J 37/04* (2013.01); *H01M 4/86* (2013.01);
(Continued)

(58) Field of Classification Search
CPC ... H01M 4/8657; H01M 4/8853; H01M 4/926
See application file for complete search history.

(56) References Cited

U.S. PATENT DOCUMENTS 9,799,889 B2 * 10/2017 Ishikawa ............. H01M 4/8657
2005/0082351 A1 * 4/2005 Pinchot ................ B01J 19/0093
228/254

(Continued)

FOREIGN PATENT DOCUMENTS

CN    103402631 A    11/2013
JP    2013-231689 A   11/2013
(Continued)

OTHER PUBLICATIONS

Takashi Ohkawa et al., "ORR activity and durability of Pd core/Pt shell structured catalyst", The 53rd Battery Symposium in Japan, Nov. 14-16, 2012, p. 390, Fukuoka Japan.

(Continued)

*Primary Examiner* — Alexander M Weddle
(74) *Attorney, Agent, or Firm* — Hunton Andrews Kurth LLP

(57) ABSTRACT

A core-shell catalyst with high platinum mass activity for a short period of time. The method for producing a core-shell catalyst may comprise a core containing palladium and a shell containing platinum and coating the core, the method comprising: a step of preparing a copper-coated palladium-containing particle dispersion in which copper-coated palladium-containing particles are dispersed, the particles being palladium-containing particles coated with copper; a step of
(Continued)

preparing a platinum ion-containing solution; a step of preparing a microreactor; and a substitution step of forming the shell by substituting the copper on the copper-coated palladium-containing particle surface with platinum by mixing the copper-coated palladium-containing particle dispersion and the platinum ion-containing solution in the microreactor.

10 Claims, 3 Drawing Sheets

(51) Int. Cl.
B01J 37/04 (2006.01)
B01J 23/44 (2006.01)
H01M 4/90 (2006.01)
H01M 4/92 (2006.01)

(52) U.S. Cl.
CPC .......... *H01M 4/88* (2013.01); *H01M 4/8853* (2013.01); *H01M 4/90* (2013.01); *H01M 4/92* (2013.01); *H01M 4/921* (2013.01); *H01M 4/926* (2013.01)

(56) References Cited

U.S. PATENT DOCUMENTS

| 2010/0210876 A1* | 8/2010 | Ryu | B01J 19/0093 564/441 |
| 2013/0324394 A1 | 12/2013 | Shao et al. | |
| 2015/0093682 A1* | 4/2015 | Kimura | H01M 4/8817 429/487 |

FOREIGN PATENT DOCUMENTS

| JP | 2013-239331 A | 11/2013 | | |
| JP | 2014108380 A | 6/2014 | | |
| JP | 2016137425 A | 8/2016 | | |
| KR | 2014-0024847 A | 3/2014 | | |
| WO | WO-2012115624 A1 * | 8/2012 | ............. | B01J 37/06 |
| WO | WO-2013172050 A1 * | 11/2013 | .......... | H01M 4/8817 |

OTHER PUBLICATIONS

Ali Abou-Hassan et al., "Multistep Continuous-Flow Microsynthesis of Magnetic and Fluorescent g-Fe2O3©SiO2 Core/Shell Nanoparticles", Angew. Chem. vol. 48, Issue 39 p. 7316-7319 (Sep. 9, 2009).
United States Patent and Trademark Office, Notice of Allowance issued to U.S. Appl. No. 15/170,075 dated Jun. 26, 2017, 14 pages.

* cited by examiner

METHOD FOR PRODUCING CORE-SHELL CATALYST

CROSS-REFERENCE TO RELATED APPLICATIONS

This is a national phase application based on the PCT International Patent Application No. PCT/JP2015/065993 filed Jun. 3, 2015, claiming priority to Japanese Patent Application No. 2014-156238 filed Jul. 31, 2014, the entire contents of both of which are incorporated herein by reference.

TECHNICAL FIELD

The present invention relates to a method for producing a core-shell catalyst.

BACKGROUND ART

As an electrode catalyst, especially as an electrode catalyst for fuel cells, a core-shell catalyst that is directed at reducing the amount of a noble metal used therein (such as platinum) is known.

For example, a method for producing a core-shell catalyst by displacement plating using copper underpotential deposition (Cu-UPD) is disclosed in Patent Literature 1.

CITATION LIST

Patent Literature 1: Japanese Patent Application Laid-Open No. 2013-239331

SUMMARY OF INVENTION

Technical Problem

A substitution reaction of copper on the surface of copper-coated palladium-containing particles with platinum, has been carried out by a method of adding, after Cu-UPD, a platinum ion-containing solution dropwise to a copper-coated palladium-containing particle dispersion which is contained in a reaction container and in which the copper-coated palladium-containing particles are dispersed (hereinafter, this method may be referred to as "dropping method").

The substitution reaction of the copper with the platinum by the dropping method is likely to occur when the platinum ion-containing solution is added dropwise to the dispersion in which the copper-coated palladium-containing particles are uniformly dispersed, and the dropped solution is non-uniformly present around the point where the solution was dropped. As a result, a platinum-containing shell is non-uniformly formed on the palladium-containing particle surface. Therefore, to uniformly form the platinum-containing shell on the palladium-containing particle surface and increase the catalyst activity per unit mass of the platinum of the core-shell catalyst (hereinafter it may be referred to as platinum mass activity), it is needed to slowly drop the platinum ion-containing solution, with stirring the copper-coated palladium-containing particle dispersion.

The dropping method has the following problem: since the dropped platinum ion-containing solution cannot be instantly uniformized in the reaction container and arbitrarily reacts with the copper-coated palladium-containing particles while the platinum ion concentration in the dispersion is not uniform, some of the palladium-containing particles are excessively or insufficiently coated and the coated state varies among the particles; therefore, the core-shell catalyst obtains insufficient platinum mass activity.

Also, the dropping method has the following problem: to sufficiently develop the substitution reaction of the copper on the copper-coated palladium-containing particle surface with the platinum, it is needed to stir the reaction solution for a long period of time, after the dropwise addition of the platinum ion-containing solution; therefore, an increase in operation costs occurs especially in the case of quantity synthesis.

The present invention was achieved in light of the above circumstances. An object of the present invention is to provide a method for producing a core-shell catalyst with high platinum mass activity, for a short period of time.

Solution to Problem

The core-shell catalyst production method of the present invention is a method for producing a core-shell catalyst comprising a core containing palladium and a shell containing platinum and coating the core, the method comprising: a step of preparing a copper-coated palladium-containing particle dispersion in which copper-coated palladium-containing particles are dispersed, the particles being palladium-containing particles coated with copper; a step of preparing a platinum ion-containing solution; and a substitution step of forming the shell by substituting the copper on the copper-coated palladium-containing particle surface with platinum by mixing the copper-coated palladium-containing particle dispersion and the platinum ion-containing solution in a microreactor.

In the core-shell catalyst production method of the present invention, the palladium-containing particles are preferably supported on a support.

In the core-shell catalyst production method of the present invention, the platinum ion-containing solution preferably comprises a reaction inhibitor for inhibiting a substitution reaction of platinum ions with the copper and the platinum.

In the core-shell catalyst production method of the present invention, the reaction inhibitor is preferably at least one selected from the group consisting of citric acid, sodium citrate and potassium citrate.

In the core-shell catalyst production method of the present invention, the citric acid ion concentration of the platinum ion-containing solution is preferably in a range of 0.5 to 2 mol/L.

In the core-shell catalyst production method of the present invention, the mixing in the substitution step is preferably carried out under a pressure condition of 5 to 200 MPa.

Advantageous Effects of Invention

According to the present invention, a core-shell catalyst with high platinum mass activity can be produced for a short period of time.

DESCRIPTION OF EMBODIMENTS

The core-shell catalyst production method of the present invention is a method for producing a core-shell catalyst comprising a core containing palladium and a shell containing platinum and coating the core, the method comprising: a step of preparing a copper-coated palladium-containing particle dispersion in which copper-coated palladium-containing particles are dispersed, the particles being palladium-containing particles coated with copper; a step of preparing a platinum ion-containing solution; and a substitution step of forming the shell by substituting the copper on the copper-coated palladium-containing particle surface with platinum by mixing the copper-coated palladium-containing particle dispersion and the platinum ion-containing solution in a microreactor.

In the dropping method, the platinum-containing shell coating state varies among the palladium-containing particles, so that the platinum mass activity of the core-shell catalyst is sometimes insufficient. Also, a substitution reaction of the copper on the copper-coated palladium-containing particle surface with platinum needs a long period of time to reach completion.

Meanwhile, according to the present invention, by use of a microreactor, contact velocity or contact frequency between the copper-coated palladium-containing particles and the platinum ion-containing solution can be controlled with accuracy, and concentration gradients in reaction sites can be inhibited. Accordingly, the variation in the platinum-containing shell coating state among the palladium-containing particles can be small, and the platinum-containing shell can be uniformly formed on the palladium-containing particle surface. Therefore, the core-shell catalyst with high platinum mass activity can be produced.

By the use of the microreactor, the substitution reaction of the copper on the copper-coated palladium-containing particle surface with platinum can be completed for a short period of time (that is, the reaction can be completed during the time in which, after mixing the copper-coated palladium-containing particle dispersion and the platinum ion-containing solution in the microreactor, the mixed solution is drained to the outside of the microreactor).

In the present invention, that the shell coats the core encompasses not only a state in which the whole surface of the core is coated with the shell, but also a state in which the core surface is partly coated with the shell and is partly exposed. Also, the shell can be either a monoatomic layer or atomic layers composed of two or more atoms stacked. From the viewpoint of increasing mass activity, the shell is preferably a monoatomic layer.

Hereinafter, the core-shell catalyst production method of the present invention will be described in detail.

Figure 1:
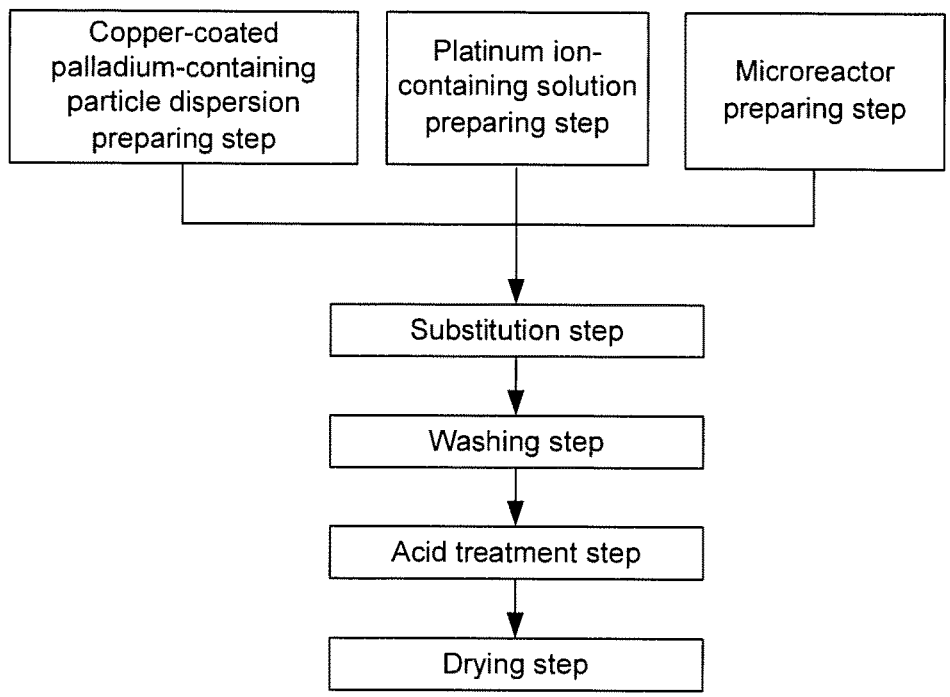
FIG. 1 is a flowchart of an example of the core-shell catalyst production method according to the present invention.

FIG. 1 is a flowchart of an example of the core-shell catalyst production method according to the present invention.

The core-shell catalyst production method of the present invention comprises (1) a step of preparing a copper-coated palladium-containing particle dispersion, (2) a step of preparing a platinum ion-containing solution, (3) a step of preparing a microreactor and (4) a substitution step. As needed, after the substitution step, the method comprises (5) a washing step, (6) an acid treatment step, (7) a drying step, etc. The steps (1) to (3) can be carried out at the same time, or any of them can be carried out earlier.

Hereinafter, the steps will be described in order.

(1) Copper-Coated Palladium-Containing Particle Dispersion Preparing Step

As the palladium-containing particles that serve as the core of the core-shell catalyst, at least one kind of particles selected from palladium particles and palladium alloy particles can be used.

As the palladium alloy, examples include, but are not limited to, an alloy of palladium and a metal selected from the group consisting of iridium, ruthenium, rhodium, iron, cobalt, nickel, copper, silver and gold. The metal (other than palladium) constituting the palladium alloy may be one or more kinds of metals.

Preferably, the palladium content of the palladium alloy is 80% by mass or more of the total mass (100% by mass) of the palladium alloy. This is because an uniform platinum-containing shell can be formed when the palladium content is 80% by mass or more.

The average particle diameter of the palladium-containing particles is not particularly limited and is preferably 10 nm or less. When the average particle diameter of the palladium-containing particles is more than 10 nm, the surface area per unit mass of platinum decreases, and a large amount of platinum is needed to obtain necessary activity and takes a high cost. When the average particle diameter of the palladium-containing particles is too small, the palladium itself becomes more soluble and decreases the durability of the catalyst. Therefore, the average particle diameter of the palladium-containing particles is preferably 3 nm or more.

The method for calculating the average particle diameter of the particles used in the present invention is as follows. First, using a transmission electron microscope (TEM), a TEM image of particles is taken at a magnification of 1,000,000×. Then, the diameter of a true circle having the same area as the image of one of the particles shown in the TEM image and projected onto a plane (equivalent circle particle diameter) is regarded as the diameter of the particle. Such a particle diameter measurement by the photographic observation is carried out on 500 particles of the same type, and the average of the diameters of the 500 particles is regarded as the average particle diameter. Partial particles shown on the edges of the image are excluded from the analysis.

Preferably, the palladium-containing particles are supported on a support. The support is not particularly limited. An electroconductive support is preferably used as the support, from the viewpoint of providing electroconductivity to the electrocatalyst layer of a fuel cell when the core-shell catalyst of the present invention is used for the electrocatalyst layer.

Examples of materials that can be used as the support for supporting the palladium-containing particles include, but are not limited to, electroconductive carbonaceous materials including carbon particles and carbon fibers, such as: Ketjen Black (product name; manufactured by: Ketjen Black International Company), Vulcan (product name; manufactured by: Cabot), Norit (product name; manufactured by: Norit), Black Pearls (product name; manufactured by: Cabot), Acetylene Black (product name; manufactured by: Chevron); metal materials including metal particles and metal fibers; and non-electroconductive materials including organic pigments, such as perylene red.

The average particle diameter of the support is not particularly limited and is preferably in a range of 0.01 μm to hundreds of micrometers (μm) and more preferably in a range of 0.01 to 1 μm. When the average particle diameter of the support is less than the range, the support may cause corrosion degradation, and the palladium-containing particles supported on the support may be detached over time. When the average particle diameter of the support is more than the range, the specific surface area is small, and the dispersibility of the palladium-containing particles may decrease.

The specific surface area of the support is not particularly limited and is preferably in a range of 50 to 2000 $m^2/g$ and more preferably in a range of 100 to 1600 $m^2/g$. When the specific surface area of the support is less than the range, the dispersibility of the palladium-containing particles onto the support decreases, and sufficient battery performance may not be obtained. When the specific surface area of the support is more than the range, the effective utilization rate of the palladium-containing particles decreases, and sufficient battery performance may not be obtained.

The palladium-containing particle supporting rate of the support, that is, [{("the mass of the palladium-containing particles")/("the mass of the palladium-containing particles"+"the mass of the support")}×100%], is not particularly limited. In general, it is preferably in a range of 20 to 60%. When the amount of the supported palladium-containing particles is too small, insufficient catalyst function may be obtained. On the other hand, when the amount of the supported palladium-containing particles is too large, there may be no problem from the viewpoint of catalyst function; however, when the amount of the palladium-containing particles supported on the support is excessive, it is difficult to obtain effects that are commensurate with an increase in production costs.

The palladium-containing particles can be supported on the support by a conventional method. As the method, examples include, but are not limited to, the following method: the palladium-containing particles are mixed with a support dispersion in which the support is dispersed; the mixture is filtered, washed, re-dispersed in ethanol or the like, and then dried using a vacuum pump or the like, thereby supporting the particles on the support. As needed, the particles may be heated after the drying. In the case of using palladium alloy particles, synthesis of the alloy and supporting of the palladium alloy particles on the support can be carried out at the same time.

The palladium-containing particle surface can be coated with copper by a conventional method. For example, the Cu-UPD method is preferably used.

In particular, the Cu-UPD method is a method of applying a nobler potential than the oxidation-reduction potential of copper to the palladium-containing particles in a copper ion-containing electrolyte.

The copper ion-containing electrolyte is not particularly limited, as long as it is an electrolyte in which copper can be deposited on the palladium-containing particle surface by Cu-UPD. The copper ion-containing electrolyte is generally composed of a solvent in which a predetermined amount of copper salt is dissolved. However, the electrolyte is not limited to this and may be an electrolyte in which part or all of the copper ions are separately present.

As the solvent used for the copper ion-containing electrolyte, examples include, but are not limited to, water and organic solvents. Water is preferred from the point of view that it does not prevent copper deposition on the palladium-containing particle surface.

As the copper salt used for the copper ion-containing electrolyte, examples include, but are not limited to, copper sulfate, copper nitrate, copper chloride, copper chlorite, copper perchlorate and copper oxalate.

The copper ion concentration of the electrolyte is not particularly limited and is preferably in a range of 10 to 1000 mmol/L.

In addition to the solvent and the copper salt, the copper ion-containing electrolyte may contain an acid, for example. Examples of acids that can be added to the copper ion-containing electrolyte include, but are not limited to, sulfuric acid, nitric acid, hydrochloric acid, chlorous acid, perchloric acid and oxalic acid. Counter anions in the copper ion-containing electrolyte and those in the acid may be the same kind or different kinds of counter anions.

It is also preferable to bubble an inert gas into the electrolyte in advance. This is because the palladium-containing particles can be inhibited from oxidation and can be uniformly coated with the platinum-containing shell. As the inert gas, for example, nitrogen gas, argon gas or the like can be used.

The palladium-containing particles may be immersed and dispersed in the electrolyte by adding the particles to the electrolyte while the particles are in a powdery state, or the palladium-containing particles may be immersed and dispersed in the electrolyte by dispersing the particles in a solvent to prepare a palladium-containing particle dispersion and adding the dispersion to the electrolyte. As the solvent used for the palladium-containing particle dispersion, examples include, but are not limited to, the same solvents as those that can be used for the above-mentioned copper ion-containing electrolyte. Also, the palladium-containing particle dispersion may contain the acid that can be added to the above-described copper ion-containing electrolyte.

Also, the palladium-containing particles may be fixed on an electroconductive substrate or working electrode, and a surface having the palladium-containing particles fixed thereon of the electroconductive substrate or working electrode may be immersed in the electrolyte. The palladium-containing particles can be fixed by the following method, for example: using an electrolyte resin (such as Nafion (trade name)) and a solvent (such as water or alcohol), a palladium-containing particle paste is prepared and applied to a surface of the electroconductive substrate or working electrode, thereby fixing the particles on the surface.

The method for applying a potential to the palladium-containing particles is not particularly limited and may be a general method. As the method, examples include, but are not limited to, a method of immersing a working electrode, counter electrode and reference electrode in the copper ion-containing electrolyte and applying a potential to the working electrode.

As the working electrode, examples include, but are not limited to, materials that can ensure electroconductivity, such as metal materials including titanium, a platinum mesh, a platinum plate and a gold plate, and electroconductive carbonaceous materials including glassy carbon and a carbon plate. Also, the reaction container can be formed with any one of the electroconductive materials and used as the working electrode. When the reaction container is formed with any one of the metal materials and used as the working electrode, from the viewpoint of preventing corrosion, it is preferable to coat the inner wall of the reaction container with $RuO_2$. When the reaction container is formed with any one of the carbonaceous materials and used as the working electrode, the container can be used as it is without any coating.

As the counter electrode, examples include, but are not limited to, electroconductive carbon fibers and a platinum mesh plated with platinum black.

As the reference electrode, examples include, but are not limited to, a reversible hydrogen electrode (RHE), a silver-silver chloride electrode and a silver-silver chloride-potassium chloride electrode.

A device is used to control the potential. As the potential control device, examples include, but are not limited to, a potentiostat and a potentio-galvanostat.

The applied potential is not particularly limited, as long as it is a potential that allows copper deposition on the palladium-containing particle surface, that is, a nobler potential than the oxidation-reduction potential of copper. For example, the applied potential is preferably in a range of 0.35 to 0.7 V (vs. RHE) and is particularly preferably 0.37 V (vs. RHE).

The potential applying time is not particularly limited, and it is preferably 60 minutes or more. It is more preferable to apply the potential until the reaction current becomes steady and close to zero.

The Cu-UPD treatment is preferably carried out under an inert gas atmosphere such as a nitrogen atmosphere, from the viewpoint of preventing the oxidation of the palladium-containing particle surface or preventing the oxidation of the copper.

In the Cu-UPD treatment, it is preferable to appropriately stir the copper ion-containing electrolyte, as needed. For example, in the case where the reaction container that serves as the working electrode is used and the palladium-containing particles are immersed and dispersed in the electrolyte contained in the reaction container, the palladium-containing particles can be brought into contact with the surface of the reaction container (working electrode) by stirring the copper ion-containing electrolyte, and the potential can be uniformly applied to the palladium-containing particles. In this case, the stirring can be carried out continuously or intermittently during the Cu-UPD treatment.

It is preferable to carry out an oxide removal treatment on the palladium-containing particles before the Cu-UPD treatment.

By the oxide removal treatment, palladium oxides (impurities) can be removed from the surface of the palladium-containing particles, and the palladium-containing particles can be uniformly coated with the platinum-containing shell.

For example, the oxide removal can be carried out by applying a predetermined potential to the palladium-containing particles in the electrolyte containing the palladium-containing particles.

The potential can be applied to the palladium-containing particles by the same method as that carried out in the Cu-UPD treatment. The potential control device can be the same device as that used for the Cu-UPD treatment.

The electrolyte that can be used for the oxide removal treatment is not particularly limited, as long as it is a solution in which palladium oxides can be eluted by an appropriate potential sweep.

As the electrolyte, examples include, but are not limited to, an acid solution. As the acid that can be used for the oxide removal treatment, examples include, but are not limited to, the same acids as those that can be used for the copper ion-containing electrolyte.

When the oxide removal treatment and the Cu-UPD treatment are carried out in the same reaction container, the copper ion-containing electrolyte may be added to the electrolyte used for the oxide removal treatment. For example, when sulfuric acid is used as the electrolyte for the oxide removal treatment, the sulfuric acid used for the oxide removal treatment may be mixed with a copper sulfate aqueous solution and then used for the Cu-UPD treatment. Counter anions in the electrolyte used for the oxide removal treatment and counter anions in the copper ion-containing electrolyte used for the Cu-UPD treatment may be the same kind or different kinds of counter anions.

It is preferable to bubble nitrogen into the electrolyte, from the viewpoint of removing oxygen as much as possible from the electrolyte and allowing quick oxide removal.

From the viewpoint of quick oxide removal, it is preferable to shift the potential back and forth in a predetermined potential range, several times. As the signal pattern of the applied potential, examples include, but are not limited to, a square wave, a triangle wave and a trapezoidal wave.

The potential range is not particularly limited. It is preferably in a range of 0.05 to 1.2 V (vs. RHE).

The signal pattern of the applied potential is not particularly limited. When the signal pattern is a square wave, it is preferable that holding 0.05 V (vs. RHE) for 15 to 60 seconds and then holding 1.2 V (vs. RHE) for 15 to 60 seconds are considered as one cycle, and the number of the potential cycles is in a range of 1000 to 10000 cycles.

When the signal pattern of the applied potential is a triangle wave, the number of the potential cycles is preferably in a range of 1000 to 10000 cycles, and the potential sweep rate can be in a range of 5 to 100 mV/sec, for example.

After the Cu-UPD treatment, the solution used for the Cu-UPD treatment can be used in the substitution step as the copper-coated palladium-containing particle dispersion, by dispersing, in the solution, the copper-coated palladium-containing particles contained therein. The acid used for the Cu-UPD treatment may be left in the copper-coated palladium-containing particle dispersion.

It is also preferable to bubble an inert gas into the copper-coated palladium-containing particle dispersion in advance. This is because the copper-coated palladium-containing particles can be inhibited from oxidation and can be uniformly coated with the platinum-containing shell. As the inert gas, examples include, but are not limited to, nitrogen gas and argon gas.

The method for dispersing the copper-coated palladium-containing particles in the solvent is not particularly limited. As the method, examples include, but are not limited to, a method of dispersing the particles using an ultrasonic homogenizer.

The mass concentration of the palladium-containing particles in the copper-coated palladium-containing particle dispersion is not particularly limited. When the palladium-containing particles are supported on the support, the mass concentration of the palladium-containing particles support is preferably in a range of 0.5 to 5 g/L.

The copper coating on the surface of the palladium-containing particles may be either a monoatomic layer of copper or atomic layers composed of two or more stacked atoms. From the viewpoint of increasing mass activity, it is preferably a monoatomic layer of copper.

(2) Platinum Ion-Containing Solution Preparing Step

The platinum ion-containing solution is not particularly limited, as long as it contains platinum ions. As needed, it contains a reaction inhibitor.

A platinum salt is used for the platinum ion-containing solution. As the platinum salt, examples include, but are not limited to, $K_2PtCl_4$ and $K_2PtCl_6$. Also, an ammonia complex such as ($[PtCl_4][Pt(NH_3)_4]$) may be used.

The platinum ion concentration of the platinum ion-containing solution is not particularly limited and is preferably in a range of 0.0005 to 0.04 mol/L.

The reaction inhibitor is not particularly limited, as long as it is able to inhibit a substitution reaction between copper with platinum. As the reaction inhibitor, examples include, but are not limited to, a complexing agent that forms, in the solution, a complex with platinum, with the copper coating on the palladium-containing particle surface, with the palladium exposed on the palladium-containing particle surface, etc.

As the complexing agent, examples include, but are not limited to, citric acid, sodium salt of citric acid, potassium salt of citric acid, ethylenediaminetetraacetic acid (hereinafter may be referred to as EDTA), sodium salt of EDTA, and potassium salt of EDTA. Of them, citric acid is preferred. These complexing agents may be used alone or in combination of two or more kinds. Since the complexing agents form a complex with platinum and copper in the solution, they are able to inhibit a substitution reaction between copper with platinum and, as a result, uniformly coat the palladium-containing particle surface with the platinum-containing shell.

The concentration of the reaction inhibitor in the platinum ion-containing solution is not particularly limited and is preferably 10 to 4000 times the platinum ion concentration.

When at least one selected from the group consisting of citric acid, sodium citrate and potassium citrate is used as the complexing agent, the citric acid ion concentration of the platinum ion-containing solution is preferably in a range of 0.5 to 2 mol/L.

The solvent that can be used for the platinum ion-containing solution can be the same solvent as that used for the above-described copper ion-containing electrolyte.

In addition to the solvent, the reaction inhibitor and the platinum salt, the platinum ion-containing solution can contain an acid, for example. The acid can be the same acid as that used for the above-described copper ion-containing electrolyte.

The platinum ion-containing solution is sufficiently stirred. From the viewpoint of preventing the oxidation of the palladium-containing particle surface or preventing the oxidation of the copper, it is preferable to bubble nitrogen into the solution in advance.

(3) Microreactor Preparing Step

In the present invention, the microreactor is a general term for flow-type reaction containers in which two or more reaction material fluids are injected into a small space through different inlets at high speed, and the reaction material fluids pass through the small space by the propulsion of the high speed injection, with instantly and uniformly being mixed in the small space, thereby developing a flow-type reaction during the process in the small space.

As the microreactor that can be used in the present invention, examples include, but are not limited to, conventionally-known microreactors such as NanoVator L-ED015 (product name; manufactured by: Yoshida Kikai Co., Ltd.)

Figure 2:
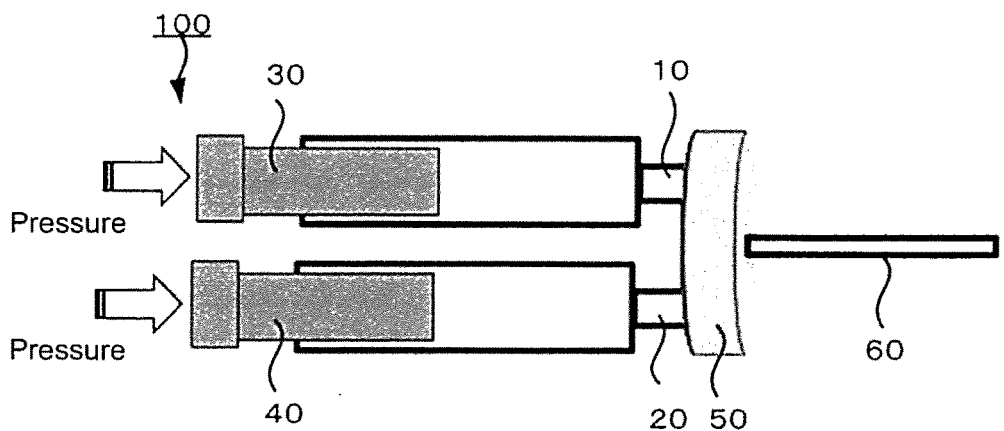
FIG. 2 is a schematic configuration view of an example of a microreactor that can be used in the present invention.

FIG. 2 is a schematic configuration view of an example of a microreactor that can be used in the present invention. As shown in FIG. 2, a microreactor 100 includes a first supply flow path 10; a second supply flow path 20; a pump 30 provided to the first supply flow path 10; a pump 40 provided to the second supply flow path 20; a junction (small space) 50 where the first supply flow path 10 and the second supply flow path 20 meet; and a drain flow path 60.

Figure 3:
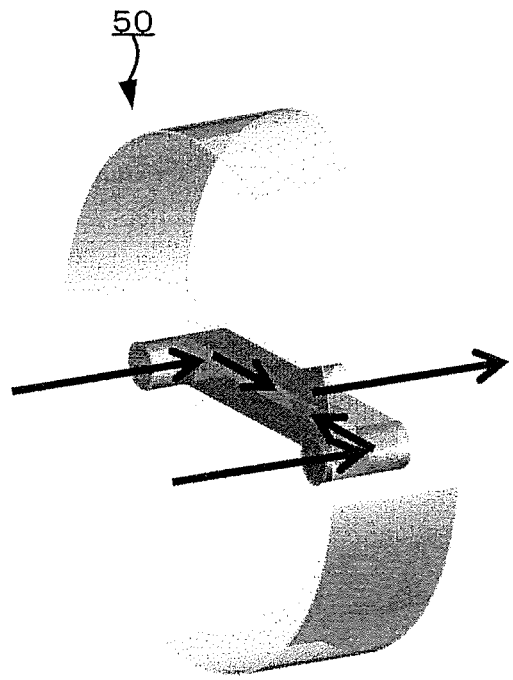
FIG. 3 is a perspective view of an example of the internal structure of a junction that can be used in the present invention.

FIG. 3 is a perspective view of an example of the internal structure of the junction 50 (nozzle) that can be used in the present invention. Arrows shown in FIG. 3 indicate the flow directions of the fluids. As shown in FIG. 3, the two fluids meet in the inside of the junction 50, and a reaction is continuously developed at the junction.

In the case of using the microreactor 100 shown in FIG. 2, two or more reaction material fluids flow through different supply flow paths. They are injected into the junction 50 (small space) at high speed by solution sending pressures, and they pass through the junction 50 by the propulsion of the high-speed injection, with being instantly and uniformly mixed in the junction 50. A flow-type reaction is developed during the process in the junction 50. The resulting reaction solution in the junction 50 is drained to the outside of the microreactor through the drain flow path 60 and collected. The reaction may be developed in the process of passing through the drain flow path 60 and inside a collection container.

The first supply flow path 10, the second supply flow path 20 and the drain flow path 60 may be straight or curved. The number of the supply flow paths is not particularly limited, as long as at least two supply flow paths are provided for mixing two or more fluids. The diameter of the flow paths (the width in a direction perpendicular to the flow direction) or the equivalent diameter thereof (in the case where the section of the flow paths is not circular) is not particularly limited. Also, the length of the flow paths in the flow direction is not particularly limited.

As the pumps 30 and 40 for applying the solution sending pressure, examples include, but are not limited to, a syringe pump and a plunger pump. By the pumps 30 and 40, the amount of the fluids mixed at the junction 50 can be always controlled in an optimal range, and the pressure applied to the junction 50 can be also controlled.

As the junction 50, examples include, but are not limited to, a nozzle. As the nozzle, examples include, but are not limited to, a cross nozzle and a straight nozzle. Of them, a cross nozzle is preferred.

The length of the nozzle in the flow direction is not particularly limited and is preferably in a range of 100 to 200 μm.

The diameter of the nozzle (the width in a direction perpendicular to the flow direction) or the equivalent diameter thereof (in the case where the section of the nozzle is not circular) is not particularly limited. It is preferably 1 mm or less, more preferably 500 μm or less, and still more preferably 100 μm or less.

The material for the nozzle is not particularly limited. As the material, examples include, but are not limited to, synthetic diamond.

(4) Substitution Step

The substitution step is a step of forming the shell by substituting the copper on the copper-coated palladium-containing particle surface with platinum by mixing the copper-coated palladium-containing particle dispersion and the platinum ion-containing solution in the microreactor.

By mixing the copper-coated palladium-containing particle dispersion and the platinum ion-containing solution, due to their difference in ionization tendency, the copper on the copper-coated palladium-containing particle surface can be substituted with platinum.

In the present invention, the shell contains platinum and/or a platinum alloy.

As the platinum alloy, examples include, but are not limited to, an alloy of platinum and a metal material selected from the group consisting of iridium, ruthenium, rhodium, nickel and gold. The metal (other than platinum) constituting the platinum alloy may be one or more kinds of metals.

Preferably, the platinum content of the platinum alloy is 90% by mass or more of the total mass (100% by mass) of the alloy. This is because sufficient catalyst activity and durability are not obtained when the platinum content is less than 90% by mass.

An example of the substitution step will be described using the microreactor 100 shown in FIG. 2.

Using the microreactor 100, the copper-coated palladium-containing particle dispersion can be supplied from the first supply flow path 10 by applying a predetermined pressure with the pump 30, and the platinum ion-containing solution can be supplied from the second supply flow path 20 by applying a predetermined pressure with the pump 40; therefore, the copper-coated palladium-containing particle dispersion and the platinum ion-containing solution can be supplied from different inlets to the junction 50 and can be mixed together. The mixed solution mixed at the junction 50 flows through the drain flow path 60 and is drained to the outside of the microreactor 100. The mixed solution drained from the drain flow path 60 is collected and stored in the collection container.

The pressures applied to the copper-coated palladium-containing particle dispersion and platinum ion-containing solution supplied from the different supply flow paths, can be the same or different. By the use of different pressures, the volumes of the copper-coated palladium-containing particle dispersion and platinum ion-containing solution supplied to the junction 50 can be different.

In the case of using the microreactor 100, the substitution reaction time is determined as a time needed by the mixed solution mixed at the junction 50 to flow through the drain flow path 60 and be drained to the outside of the microreactor 100.

In the substitution step, the temperatures of the copper-coated palladium-containing particle dispersion and the platinum ion-containing solution when they are supplied into the microreactor, are not particularly limited and may be room temperature (25° C.)

From the viewpoint of preventing the oxidation of the palladium-containing particle surface and preventing the oxidation of the copper, it is preferable that the copper-coated palladium-containing particle dispersion and the platinum ion-containing solution are not exposed to the air when they are supplied into the microreactor.

The applied pressure condition inside the junction at the time of mixing the copper-coated palladium-containing particle dispersion and the platinum ion-containing solution, is not particularly limited and is preferably in a range of 5 to 200 MPa.

The flow rate of the copper-coated palladium-containing particle dispersion and the platinum ion-containing solution at the time of mixing them, is not particularly limited. It is preferable that the flow rate of the copper-coated palladium-containing particle dispersion is in a range of 3 to 20 mL/sec when the dispersion passes through the junction 50.

The volume ratio of the copper-coated palladium-containing particle dispersion to the platinum ion-containing solution at the time of mixing them, is not particularly limited and can be appropriately determined depending on the mass concentration of the copper-coated palladium-containing particles in the copper-coated palladium-containing particle dispersion, the platinum ion concentration of the platinum ion-containing solution, etc. For example, it is preferably 1:1 to 8:1.

In the platinum ion-containing solution preparing step, when at least one selected from the group consisting of citric acid, sodium citrate and potassium citrate is added to the platinum ion-containing solution as the reaction inhibitor, the citric acid ion concentration at the time of the mixing is not particularly limited. It is preferably more than 0.05 mol/L and 2 mol/L or less, with respect to a mass concentration of the copper-coated palladium-containing particles of 1 g/L.

The platinum ion concentration of the mixed solution of the copper-coated palladium-containing particle dispersion and the platinum ion-containing solution is not particularly limited. Preferably, it is 1 to 1.5 times the theoretical material amount needed to coat a geometric palladium particle surface with a monoatomic layer of platinum.

The theoretical material amount is calculated by the following method.

Figure 4:
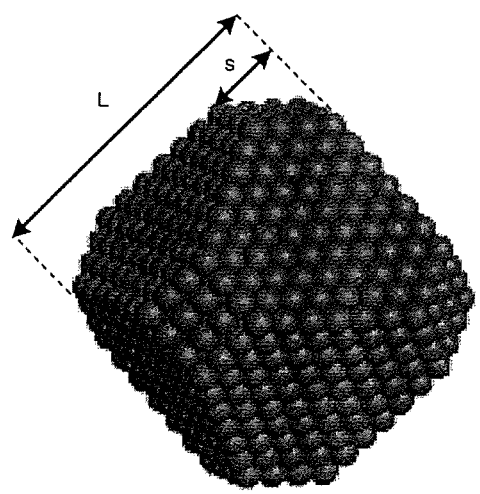
FIG. 4 is a view of a truncated octahedron.

First, spheres having the diameter of a palladium atom are arranged so as to form a face-centered cubic lattice, and a model structure in which a truncated octahedron as shown in FIG. 4 is formed by the arranged spheres, is devised. The truncated octahedron shown in FIG. 4 is a structure that is obtained when s/L=0.2, that is, the ratio of a side (s) of a truncated part of the octahedron to a side (L) of the octahedron, is 0.2.

Using this truncated octahedron, the total number of atoms contained in palladium particles having different particle diameters and the number of surface atoms are calculated. Then, from the ratio of the surface atoms to the total number of the atoms, the theoretical material amount needed to coat the geometric palladium surface with a monoatomic layer of platinum, is calculated. The palladium particle diameter is regarded as the distance between two opposite sides of a projected image of the truncated octahedron particle viewed from directly above.

When the palladium particle diameter is 4 nm (which is a theoretically calculated diameter and, to be exact, the palladium particle diameter is 4.2 nm), the theoretical material amount needed to coat the geometric palladium surface with a monoatomic layer of platinum is 0.364 mole of platinum with respect to 1 mole of palladium.

The mixed solution of the copper-coated palladium-containing particle dispersion and platinum ion-containing solution drained from the microreactor may be collected under the air atmosphere or under an inert gas atmosphere such as a nitrogen gas or argon gas atmosphere. From the viewpoint of substituting unreacted copper with platinum, it is preferable to collect the mixed solution under the inert gas atmosphere. It is also preferable to stir the mixed solution under the inert gas atmosphere, as needed. The stirring time under the inert gas atmosphere is not particularly limited and is preferably in a range of 1 to 90 minutes.

(5) Washing Step

The washing step is a step of washing the obtained core-shell catalyst with water after the substitution step. From the viewpoint of eluting the reaction inhibitor physically adsorbed to the support surface, it is preferable to carry out the washing step before the acid treatment step which will be described below under "(6) Acid treatment step".

In the washing step, cold water or warm water may be used as the water. Also, cold water and warm water may be used in combination to wash the core-shell catalyst. More specifically, the palladium-containing particles may be washed with cold water at less than 30° C. and then washed with warm water.

The temperature of the warm water is preferably 30° C. or more and 100° C. or less, from the viewpoint of eluting the reaction inhibitor physically adsorbed to the support surface.

The washing step is preferably a step of dispersing the palladium-containing particles in water (preferably in warm water) and washing them. The method for dispersing the palladium-containing particles in water is not particularly limited. As the method, examples include, but are not limited to, an ultrasonic dispersion method, a method of adding the palladium-containing particles to water after pulverizing them with a ball mill, and a method of dispersing the palladium-containing particles with a shearing device such as a nanomizer. Of them, the ultrasonic dispersion method is preferred from the point of view that the structure of the palladium-containing particles are relatively less likely to be damaged.

The washing step is preferably repeated until the conductivity of the water used for the washing (hereinafter the water may be referred to as washing water) reaches 10 μS/cm or less. This is because the amount of the reaction inhibitor physically adsorbed to the support surface can be determined to be still large, when the conductivity of the washing water is high. The washing water means a supernatant solution obtained by adding, per liter of water in a container, 10 g of the palladium-containing particle support on which the palladium-containing particles are supported, and dispersing the support.

(6) Acid Treatment Step

The acid treatment step is a step of bringing the core-shell catalyst obtained after the substitution step into contact with an acid solution. By the acid treatment, the exposed palladium is selectively eluted and makes the palladium-containing particles smaller, thereby coating shell defects with the shell. Therefore, the platinum mass activity of the core-shell catalyst can be increased.

As the acid solution, examples include, but are not limited to, nitric acid, sulfuric acid, perchloric acid, hydrochloric acid and hypochlorous acid. Of them, nitric acid is preferred from the point of view that it has an oxidizing power that is sufficient to dissolve palladium.

For example, in the case of using nitric acid as the acid solution, the concentration of the nitric acid is preferably in a range of $1.0 \times 10^{-4}$ to 2 mol/L, more preferably in a range of $1.0 \times 10^{-3}$ to 1 mol/L, and still more preferably in a range of $1.0 \times 10^{-2}$ to $1.0 \times 10^{-1}$ mol/L.

In the case of using sulfuric acid as the acid solution, the concentration of the sulfuric acid is preferably in a range of $1.0 \times 10^{-4}$ to 2 mol/L, more preferably in a range of $1.0 \times 10^{-3}$ to 1 mol/L, and still more preferably in a range of $1.0 \times 10^{-2}$ to $1.0 \times 10^{-1}$ mol/L.

The temperature of the acid solution is preferably 40° C. or more, and particularly preferably 50° C. or more, since the defects in the shell can be effectively and efficiently mended. From the viewpoint of preventing the core-shell catalyst from aggregation, etc., the temperature of the acid solution is preferably 90° C. or less, and particularly preferably 80° C. of less.

The contact time of the core-shell catalyst with the acid solution can be appropriately determined depending on the type, concentration, temperature, etc., of the acid solution. For example, it may be in a range of about 30 minutes to about 2 hours.

The method for bringing the core-shell catalyst in contact with the acid solution is not particularly limited. From the viewpoint of sufficiently developing the acid treatment, a method for immersing the core-shell catalyst in the acid solution is preferred. It is preferable that during the immersion, the acid solution is dispersed and stirred by use of an ultrasonic homogenizer, a magnetic stirrer, a motor furnished with stirring blades, or the like.

(7) Drying Step

The drying step is a step of drying the core-shell catalyst obtained after the substitution step.

The method for drying the core-shell catalyst is not particularly limited, as long as it is a method that can remove the solvent, etc. As the method, examples include, but are not limited to, a method of keeping a temperature of 50 to 100° C. for 6 to 12 hours under an inert gas atmosphere.

As needed, the core-shell catalyst may be pulverized. The pulverizing method is not particularly limited, as long as it is a method that can pulverize solids. As the method, examples include, but are not limited to, pulverization using a mortar or the like under an inert gas atmosphere or under the atmosphere, and mechanical milling using a ball mill, a turbo mill, a jet mill or the like.

EXAMPLES

Example 1

A commercially-available palladium-supported carbon (Pd/C) in which palladium particles having an average diameter of 4 nm are supported on carbon particles (supported Pd rate: 30% by mass) was taken.

First, 20 g of the Pd/C was put in a reaction container. In addition, 10 L of ultrapure water was added therein, and the Pd/C was dispersed for 2 hours with an ultrasonic homogenizer. Then, sulfuric acid was added therein, thereby preparing a Pd/C dispersion. The sulfuric acid concentration of the Pd/C dispersion was set to 0.05 mol/L, and the total amount of the Pd/C dispersion was set to 40 L. That is, the Pd/C dispersion was prepared so that the mass concentration of the Pd/C in the Pd/C dispersion was set to 0.5 g/L.

[Oxide Removal Treatment]

Next, a working electrode (glassy carbon), a counter electrode (platinum mesh) and a reference electrode (silver-silver chloride) were placed in the reaction container so that they were immersed in the Pd/C dispersion.

The reaction container was hermetically closed. Nitrogen gas was bubbled into the Pd/C dispersion to remove oxygen from the dispersion.

Then, a potentiostat was connected to the working electrode, the counter electrode and the reference electrode. Applying a potential in a triangle wave signal pattern at a potential sweep rate of 20 mV/sec in a potential range of 0.05 to 1.2 V (vs. RHE), was determined as one cycle, and 1000 cycles were carried out on the working electrode to remove impurities and oxides from the palladium particle surface. The potential of the silver-silver chloride electrode was converted to RHE and mentioned below.

[Cu-UPD Treatment]

With bubbling nitrogen into the Pd/C dispersion in the reaction container, copper sulfate pentahydrate was added to the reaction solution so that the copper ion concentration of the Pd/C dispersion was set to 0.05 mol/L.

Then, the potential of the working electrode was fixed at 0.37 V (vs. RHE) by the potentiostat to deposit copper on the palladium particle surface. Sometimes, the mixture in the reaction container was stirred with a stirrer. The potential was kept applied until the reaction current became steady and close to zero.

[Copper-Coated Palladium-Containing Particle Dispersion Preparing Step]

Thereafter, in the reaction container, the thus-obtained copper-coated palladium particles were dispersed with the ultrasonic homogenizer, thereby preparing 40 L of a copper-coated palladium particle dispersion. The Pd/C mass concentration of the copper-coated palladium particle dispersion was set to 0.5 g/L.

[Platinum Ion-Containing Solution Preparing Step]

As the platinum ion-containing solution, 20 L of a 0.001 mol/L $K_2PtCl_4$ solution was taken.

[Microreactor Preparing Step]

As a microreactor, NanoVator L-ED015 (product name; manufactured by Yoshida Kikai Co., Ltd.) was taken.

[Substitution Step]

Into the microreactor, the copper-coated palladium particle dispersion and the platinum ion-containing solution were supplied from a first supply flow path and a second supply flow path, respectively, preventing both the dispersion and the solution from exposure to oxygen. The copper on the palladium particle surface was substituted with platinum, while the pressure applied to the junction in the microreactor was set to 25 MPa, and the flow rate of the copper-coated palladium particle dispersion at the time of passing through the junction was set to 7 mL/sec.

The amounts of the copper-coated palladium particle dispersion and platinum ion-containing solution supplied into the microreactor were controlled so that they were at a volume ratio of 2:1 when they were mixed at the junction, that is, the amounts of the dispersion and the solution were controlled so that Pd/C mass concentration (g/L) and platinum ion concentration (mol/L) were at a ratio of 1:0.001.

The temperatures of the copper-coated palladium particle dispersion and the platinum ion-containing solution when they were supplied into the microreactor, were set to 25° C. each.

The time needed by the copper-coated palladium particle dispersion (40 L) to pass through the junction was about 100 minutes.

After the mixing, the mixed solution of the copper-coated palladium particle dispersion and the platinum ion-containing solution was collected and stored in a collection container disposed at the lower flow end of a drain flow path, and the collected mixed solution was stirred for 90 minutes under a nitrogen atmosphere.

[Washing Step]

After the substitution step, the mixed solution in the collection container was filtered under reduced pressure to obtain a slurry powder. The slurry powder was washed with 4 L of pure water.

A filtered product obtained by the pure water washing was put in 1 L of pure water, filtered and then measured for conductivity under the following conditions:

Measurement device: Conductivity Meter AOL-40 (product name; manufactured by: DKK)

Measurement temperature: 25° C.

When the conductivity of a supernatant solution was more than 10 μS/cm, the dispersion was filtered to obtain a product, and the filtered product was put in 1 L of pure water again and repeatedly washed with warm water. On the other hand, when the conductivity of the washing water was 10 μS/cm or less, the dispersion was filtered to obtain a catalyst cake.

[Acid Treatment Step]

The washed catalyst cake was collected, put in pure water, dispersed by the use of the ultrasonic homogenizer, and then mixed with nitric acid, thereby preparing a 1 mol/L nitric acid dispersion. The nitric acid dispersion was prepared so that the solid concentration of the nitric acid dispersion medium was set to 1 g/mL. The nitric acid dispersion was stirred at 50° C. for 30 minutes. Then, the nitric acid dispersion was filtered and repeatedly washed with pure water until the filtrate became neutral.

[Drying Step]

The washed catalyst cake was dried in a vacuum drying oven at 60° C. for 10 hours until the moisture content reached about 5% or less, thereby obtaining a powdery sample. The powdery sample was pulverized with a commercially-available knife cutter, thereby obtaining a core-shell catalyst.

Example 2

A core-shell catalyst was produced in the same manner as Example 1, except that in the platinum ion-containing solution preparing step, 20 L of a 0.001 mol/L $K_2PtCl_4$ solution mixed with citric acid at a concentration of 1 mol/L, was prepared as the platinum ion-containing solution, and in the substitution step, the amounts of the copper coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1.

Example 3

A core-shell catalyst was produced in the same manner as Example 1, except that in the platinum ion-containing solution preparing step, 40 L of a 0.0005 mol/L $K_2PtCl_4$ solution mixed with citric acid at a concentration of 0.5 mol/L, was prepared as the platinum ion-containing solution, and in the substitution step, the amounts of the copper-coated palladium particle dispersion and platinum ion-containing solution supplied into the microreactor were controlled so that the copper-coated palladium particle dispersion and the platinum ion-containing solution were at a volume ratio of 1:1 when they were mixed at the junction, that is, Pd/C mass concentration (g/L), platinum ion concentration (mol/L) and citric acid ion concentration (mol/L) were at a ratio of 1:0.001:1.

Example 4

A core-shell catalyst was produced in the same manner as Example 1, except that in the platinum ion-containing solution preparing step, 20 L of a 0.001 mol/L $K_2PtCl_4$ solution mixed with citric acid at a concentration of 1 mol/L, was prepared as the platinum ion-containing solution, and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1, and the mixed solution of the copper-coated palladium particle dispersion and the platinum ion-containing solution was collected in a collection container disposed at the lower flow end of the drain flow path and was stored under the air atmosphere.

Example 5

A core-shell catalyst was produced in the same manner as Example 1, except that in the platinum ion-containing solution preparing step, 20 L of a 0.001 mol/L $K_2PtCl_4$ solution mixed with citric acid at a concentration of 1 mol/L, was prepared as the platinum ion-containing solution, and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1, and the copper on the palladium particle surface was substituted with platinum by controlling the pressure applied to the junction to 5 MPa and the flow rate of the copper-coated palladium particle dispersion when the dispersion passed through the junction to 3 mL/sec.

The time needed by the copper-coated palladium particle dispersion (40 L) to pass through the junction was about 220 minutes.

Example 6

A core-shell catalyst was produced in the same manner as Example 1, except that in the platinum ion-containing solution preparing step, 20 L of a 0.001 mol/L $K_2PtCl_4$ solution mixed with citric acid at a concentration of 1 mol/L, was prepared as the platinum ion-containing solution, and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1, and the copper on the palladium particle surface was substituted with platinum by controlling the pressure applied to the junction to 50 MPa and the flow rate of the copper-coated palladium particle dispersion when the dispersion passed through the junction to 10 mL/sec.

The time needed by the copper-coated palladium particle dispersion (40 L) to pass through the junction was about 70 minutes.

Example 7

A core-shell catalyst was produced in the same manner as Example 1, except that in the platinum ion-containing solution preparing step, 20 L of a 0.001 mol/L $K_2PtCl_4$ solution mixed with citric acid at a concentration of 1 mol/L, was prepared as the platinum ion-containing solution, and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1, and the copper on the palladium particle surface was substituted with platinum by controlling the pressure applied to the junction to 100 MPa and the flow rate of the copper-coated palladium particle dispersion when the dispersion passed through the junction to 14 mL/sec.

The time needed by the copper-coated palladium particle dispersion (40 L) to pass through the junction was about 50 minutes.

Example 8

A core-shell catalyst was produced in the same manner as Example 1, except that in the platinum ion-containing solution preparing step, 20 L of a 0.001 mol/L $K_2PtCl_4$ solution mixed with citric acid at a concentration of 1 mol/L, was prepared as the platinum ion-containing solution, and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1, and the copper on the palladium particle surface was substituted with platinum by controlling the pressure applied to the junction to 200 MPa and the flow rate of the copper-coated palladium particle dispersion when the dispersion passed through the junction to 20 mL/sec.

The time needed by the copper-coated palladium particle dispersion (40 L) to pass through the junction was about 30 minutes.

Example 9

A core-shell catalyst was produced in the same manner as Example 1, except that in the platinum ion-containing solution preparing step, 20 L of a 0.001 mol/L $K_2PtCl_4$ solution mixed with citric acid at a concentration of 2 mol/L was prepared as the platinum ion-containing solution, and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:2.

Example 10

A core-shell catalyst was produced in the same manner as Example 1, except that in the copper-coated palladium particle dispersion preparing step, using 40 g of Pd/C as a raw material, the copper-coated palladium particle dispersion was prepared at a Pd/C mass concentration of 1.0 g/L; in the platinum ion-containing solution preparing step, 20 L of a 0.002 mol/L $K_2PtCl_4$ solution mixed with citric acid at a concentration of 2 mol/L, was prepared as the platinum ion-containing solution; and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:1.

Example 11

A core-shell catalyst was produced in the same manner as Example 1, except that in the copper-coated palladium particle dispersion preparing step, using 100 g of Pd/C as a raw material, the copper-coated palladium particle dispersion was prepared at a Pd/C mass concentration of 2.5 g/L; in the platinum ion-containing solution preparing step, 20 L of a 0.005 mol/L $K_2PtCl_4$ solution mixed with citric acid at a concentration of 2 mol/L, was prepared as the platinum ion-containing solution; and in the substitution step, the amounts of the copper-coated palladium particle dispersion and platinum ion-containing solution supplied into the microreactor were controlled so that Pd/C mass concentration (g/L), platinum ion concentration (mol/L) and citric acid ion concentration (mol/L) were at a ratio of 1:0.001:0.4.

Example 12

A core-shell catalyst was produced in the same manner as Example 1, except that in the copper-coated palladium particle dispersion preparing step, using 100 g of Pd/C as a raw material, the copper-coated palladium particle dispersion was prepared at a Pd/C mass concentration of 2.5 g/L; in the platinum ion-containing solution preparing step, 40 L of a 0.0025 mol/L $K_2PtCl_4$ solution mixed with citric acid at a concentration of 2 mol/L, was prepared as the platinum ion-containing solution; and in the substitution step, the amounts of the copper-coated palladium particle dispersion and platinum ion-containing solution supplied into the microreactor were controlled so that the copper-coated palladium particle dispersion and the platinum ion-containing solution were at a volume ratio of 1:1 at the time of reaction at the junction, that is, Pd/C mass concentration (g/L), platinum ion concentration (mol/L) and citric acid ion concentration (mol/L) were at a ratio of 1:0.001:0.8.

Example 13

A core-shell catalyst was produced in the same manner as Example 1, except that in the copper-coated palladium particle dispersion preparing step, using 100 g of Pd/C as a raw material, the copper-coated palladium particle dispersion was prepared at a Pd/C mass concentration of 2.5 g/L; in the platinum ion-containing solution preparing step, 10 L of a 0.01 mol/L $K_2PtCl_4$ solution mixed with citric acid at a concentration of 2 mol/L, was prepared as the platinum ion-containing solution; and in the substitution step, the amounts of the copper-coated palladium particle dispersion and platinum ion-containing solution supplied into the microreactor were controlled so that the copper-coated palladium particle dispersion and the platinum ion-containing solution were at a volume ratio of 4:1 at the time of reaction at the junction, that is, Pd/C mass concentration (g/L) platinum ion concentration (mol/L) and citric acid ion concentration (mol/L) were at a ratio of 1:0.001:0.2.

Example 14

A core-shell catalyst was produced in the same manner as Example 1, except that in the copper-coated palladium particle dispersion preparing step, using 200 g of Pd/C as a raw material, the copper-coated palladium particle dispersion was prepared at a Pd/C mass concentration of 5 g/L; in the platinum ion-containing solution preparing step, 5 L of a 0.04 mol/L $K_2PtCl_4$ solution mixed with citric acid at a concentration of 2 mol/L, was prepared as the platinum ion-containing solution; and in the substitution step, the amounts of the copper-coated palladium particle dispersion and platinum ion-containing solution supplied into the microreactor were controlled so that the copper-coated palladium particle dispersion and the platinum ion-containing solution were at a volume ratio of 8:1 at the time of reaction at the junction, that is, Pd/C mass concentration (g/L), platinum ion concentration (mol/L) and citric acid ion concentration (mol/L) were at a ratio of 1:0.001:0.05.

Comparative Example 1

A core-shell catalyst was produced in the same manner as Example 1, except that the microreactor was not used; the substitution step was not carried out; and in place of the substitution step, 40 L of a copper-coated palladium particle dispersion at a Pd/C mass concentration of 0.5 g/L, which was kept at 25° C., was supplied to the reaction container, and with stirring the dispersion, as the platinum ion-containing solution, 2 L of a 0.01 mol/L $K_2PtCl_4$ solution was added dropwise to the dispersion for 90 minutes, using a tube pump, and then the copper on the palladium particle surface was substituted with platinum by stirring the mixed solution of the copper-coated palladium particle dispersion and the platinum ion-containing solution for 1600 minutes (24 hours).

Comparative Example 2

A core-shell catalyst was produced in the same manner as Comparative Example 1, except that a 0.01 mol/L $K_2PtCl_4$ solution mixed with citric acid at a concentration of 1 mol/L, was used as the platinum ion-containing solution.

Comparative Example 3

A core-shell catalyst was produced in the same manner as Comparative Example 1, except that the copper-coated palladium particle dispersion was kept at 5° C., and a 0.01 mol/L $K_2PtCl_4$ solution mixed with citric acid at a concentration of 1 mol/L, was used as the platinum ion-containing solution.

Figure 5A:
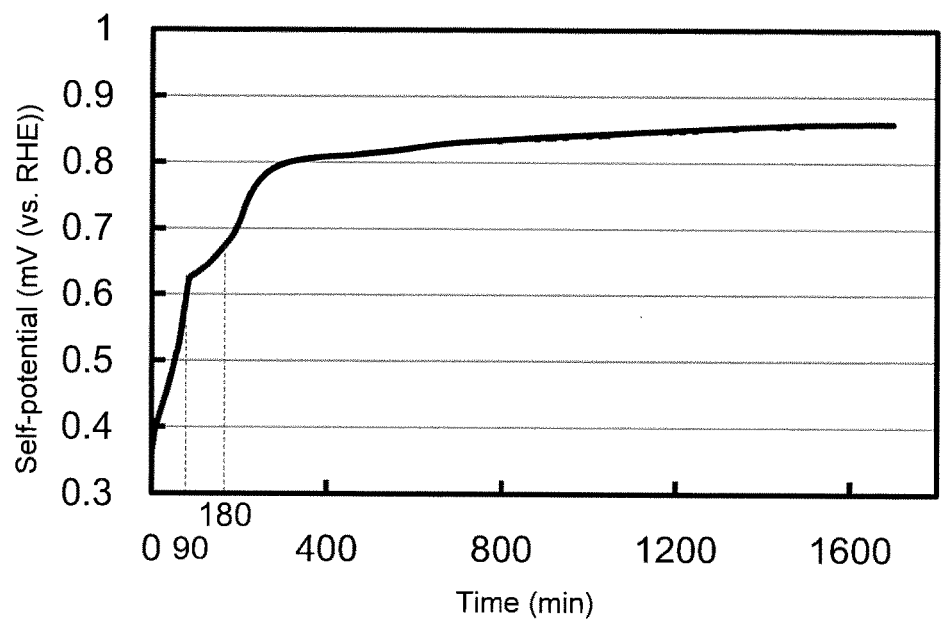
FIG. 5A is a view showing the self-potential of copper-coated palladium particles with respect to the time from the start to end of a substitution reaction for Comparative Example 3.
Figure 5B:
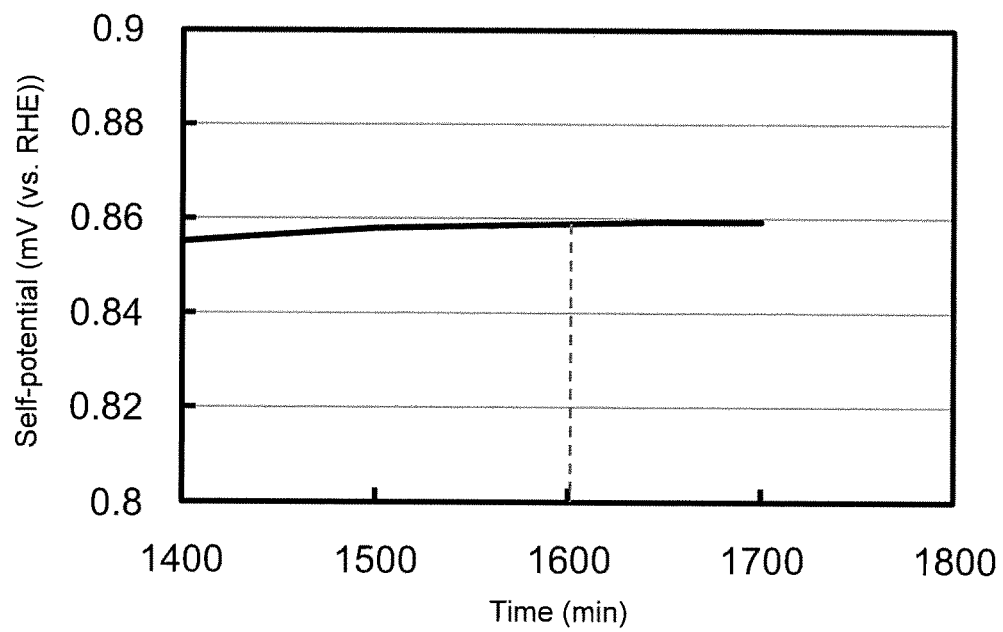
FIG. 5B is an enlarged view of the self-potential of the copper-coated palladium particles with respect to the time when 1400 to 1690 minutes passed from the start of the substitution reaction shown in FIG. 5A.

FIGS. 5A and 5B show the measurement results of the self-potential of the copper-coated palladium particles after the start of the substitution reaction in Comparative Example 3. FIG. 5A is a view showing the self-potential of the copper-coated palladium particles with respect to the time from the start to end of the substitution reaction. FIG. 5B is an enlarged view of the self-potential of the copper-coated palladium particles with respect to the time when 1400 to 1690 minutes passed from the start of the substitution reaction shown in FIG. 5A.

As shown in FIG. 5A, at the time when 90 minutes passed after the start of the substitution reaction (that is, at the time when the dropwise addition of all the platinum ion-containing solution (2 L) was completed), the self-potential was still as low as 0.63 mV (vs. RHE) and it is clear that the substitution reaction was not yet sufficiently developed.

Meanwhile, as shown in FIG. 5B, at the time when 1690 minutes passed after the start of the substitution reaction, the self-potential became steady at around 0.86 mV (vs. RHE) and it is clear that the reaction was sufficiently developed.

Therefore, it is clear that the dropping method needs a long time (one or more days) to sufficiently develop the substitution reaction.

Comparative Example 4

A core-shell catalyst was produced in the same manner as Comparative Example 1, except that the copper-coated palladium particle dispersion was kept at 5° C.; 20 L of a 0.001 mol/L $K_2PtCl_4$ solution mixed with citric acid at a concentration of 1 mol/L, was prepared as the platinum ion-containing solution; the platinum ion-containing solution was added dropwise to the dispersion for 900 minutes, using the tube pump; and then the copper on the palladium particle surface was substituted with platinum by stirring a mixed solution of the copper-coated palladium particle dispersion and the platinum ion-containing solution for 1100 minutes.

[Mass Activity Evaluation]

First, 30 mg of the core-shell catalyst obtained in Example 1 was dispersed in a mixed solution of 131 µL of a 5% Nafion (trade name) dispersion, 30 mL of ultrapure water and 7.5 mL of isopropanol, thereby producing a catalyst ink. The catalyst ink was applied onto the glassy carbon electrode of a rotating disk electrode (RDE) and naturally dried.

Then, the oxygen reduction reaction (ORR) measurement was carried out on the core-shell catalyst. In the same manner as Example 1, the oxygen reduction reaction (ORR)

measurement was carried out on the core-shell catalysts of Examples 2 to 14 and Comparative Examples 1 to 4.

The ORR measurement conditions are as follows.
Electrolyte: A 0.1 mol/L perchloric acid aqueous solution (saturated with oxygen by oxygen gas bubbling in advance)
Atmosphere: Under an oxygen atmosphere
Sweep rate: 10 mV/sec
Potential sweep range: 1.05 to 0.05 V (vs. RHE)
Rotational frequency: 1600 rpm An oxygen reduction wave was obtained by the ORR measurement, and from the oxygen reduction wave, the catalyst activity (MA) per unit mass of platinum of each core-shell catalyst was measured.

The platinum catalyst activity of each core-shell catalyst was obtained as follows. First, current values at 0.9 V (vs. RHE) and 0.3 V (vs. RHE) in the second cycle of the oxygen reduction wave obtained by the ORR measurement, were considered as an oxygen reduction current ($I_{0.9}$) and a diffusion limited current ($I_{lim}$), respectively; an activation controlled current (Ik) was obtained from the below-mentioned formula (1); and Ik (A) was divided by the platinum amount (g) contained in the core-shell catalyst applied onto the glassy carbon electrode, thereby calculating the catalyst activity (A/g-Pt) per unit mass of platinum.

$$Ik = (I_{lim} \times I_{0.9})/(I_{lim} - I_{0.9})$$ [Formula (1)]

The meanings of the symbols in the formula (1) are as follows:
Ik: Activation controlled current (A)
$I_{lim}$: Diffusion limited current (A)
$I_{0.9}$: Oxygen reduction current (A)

The measurement results of the catalyst activity per unit mass of platinum are shown in Table 1.

[Comparison of Mass Activity]

As shown in Table 1, the platinum mass activity of the core-shell catalyst is 725 A/g-Pt in Example 1, 750 A/g-Pt in Example 2, 760 A/g-Pt in Example 3, 705 A/g-Pt in Example 4, 710 A/g-Pt in Example 5, 770 A/g-Pt in Example 6, 760 A/g-Pt in Example 7, 765 A/g-Pt in Example 8, 735 A/g-Pt in Example 9, 740 A/g-Pt in Example 10, 735 A/g-Pt in Example 11, 755 A/g-Pt in Example 12, 730 A/g-Pt in Example 13, 725 A/g-Pt in Example 14, 360 A/g-Pt in Comparative Example 1, 460 A/g-Pt in Comparative Example 2, 670 A/g-Pt in Comparative Example 3, and 640 A/g-Pt in Comparative Example 4.

Since the platinum mass activity of the core-shell catalyst is higher in Examples 1 to 14 than in Comparative Examples 1 to 4, it is clear that the core-shell catalyst with higher activity than that produced by the dropping method, was produced by the present invention.

[Comparison of Substitution Reaction Temperature]

As shown in Table 1, from a comparison between Examples 1 to 14 and Comparative Examples 3 and 4, it is clear that the platinum mass activity is higher in Examples 1 to 14 (in which the copper-coated palladium particle dispersion and the platinum ion-containing solution were mixed in the microreactor without carrying out the low temperature (5° C.) treatment on both the copper-coated palladium particle dispersion and the platinum ion-containing solution) than in Comparative Examples 3 and 4 (in which the low temperature treatment was carried out on the copper-coated palladium particle dispersion).

Therefore, it is clear that the core-shell catalyst with higher activity than that produced by the dropping method, was produced by the present invention, without the low temperature treatment.

[Presence of Nitrogen Purge]

As shown in Table 1, a comparison between Example 4 and Comparative Examples 3 and 4 shows that the platinum mass activity is higher in Example 4 (in which the copper-coated palladium particle dispersion and the platinum ion-containing solution were mixed in the microreactor, and then the mixed solution was collected and stored under the air environment) than in Comparative Example 3 (in which the substitution reaction was carried out by the dropping method under the nitrogen atmosphere for 1690 minutes) and Com-

TABLE 1

| | Synthesis method | Copper-coated Pd/C dispersion Pd/C concentration (g/L) | Platinum ion-containing solution | | Volume ratio (Copper-coated Pd/C dispersion:platinum ion-containing solution) | Synthesis temperature (° C.) | Pressure (MPa) | Time needed to pass through junction (min) | Nitrogen purge time (min) | Catalyst activity (A/g-Pt) |
|---|---|---|---|---|---|---|---|---|---|---|
| | | | Platinum ion concentration (mol/L) | Citric acid concentration (mol/L) | | | | | | |
| Example 1 | Microreactor | 0.5 | 0.001 | 0 | 2:1 | 25 | 25 | 100 | 90 | 725 |
| Example 2 | | 0.5 | 0.001 | 1.0 | 2:1 | 25 | 25 | 100 | 90 | 750 |
| Example 3 | | 0.5 | 0.0005 | 0.5 | 1:1 | 25 | 25 | 100 | 90 | 760 |
| Example 4 | | 0.5 | 0.001 | 1.0 | 2:1 | 25 | 25 | 100 | 0 | 705 |
| Example 5 | | 0.5 | 0.001 | 1.0 | 2:1 | 25 | 5 | 220 | 90 | 710 |
| Example 6 | | 0.5 | 0.001 | 1.0 | 2:1 | 25 | 50 | 70 | 90 | 770 |
| Example 7 | | 0.5 | 0.001 | 1.0 | 2:1 | 25 | 100 | 50 | 90 | 760 |
| Example 8 | | 0.5 | 0.001 | 1.0 | 2:1 | 25 | 200 | 30 | 90 | 765 |
| Example 9 | | 0.5 | 0.001 | 2.0 | 2:1 | 25 | 25 | 100 | 90 | 735 |
| Example 10 | | 1 | 0.002 | 2.0 | 2:1 | 25 | 25 | 100 | 90 | 740 |
| Example 11 | | 2.5 | 0.005 | 2.0 | 2:1 | 25 | 25 | 100 | 90 | 735 |
| Example 12 | | 2.5 | 0.0025 | 2.0 | 1:1 | 25 | 25 | 100 | 90 | 755 |
| Example 13 | | 2.5 | 0.01 | 2.0 | 4:1 | 25 | 25 | 100 | 90 | 730 |
| Example 14 | | 5 | 0.04 | 2.0 | 8:1 | 25 | 25 | 100 | 90 | 725 |
| Comparative Example 1 | Dropwise | 0.5 | 0.01 | 0 | 20:1 | 25 | — | — | 1690 | 360 |
| Comparative Example 2 | | 0.5 | 0.01 | 1.0 | 20:1 | 25 | — | — | 1690 | 460 |
| Comparative Example 3 | | 0.5 | 0.01 | 1.0 | 20:1 | 5 | — | — | 1690 | 670 |
| Comparative Example 4 | | 0.5 | 0.001 | 1.0 | 2:1 | 5 | — | — | 2000 | 640 | parative Example 4 (in which the substitution reaction was carried out by the dropping method under the nitrogen atmosphere for 2000 minutes).

Therefore, it is clear that in the dropping method, the substitution reaction is needed to be carried out under an inert gas atmosphere such as nitrogen gas; however, in the present invention, the core-shell catalyst with higher activity than that produced by the dropping method were produced even though the collected mixed solution obtained by mixing the copper-coated palladium particle dispersion and the platinum ion-containing solution in the microreactor, was not stirred under an inert gas atmosphere.

From a comparison between Example 4 and Examples 1 to 3 and 5 to 14, it is clear that the platinum mass activity is higher in Examples 1 to 3 and 5 to 14 (in which the collected mixed solution obtained by mixing the copper-coated palladium particle dispersion and the platinum ion-containing solution in the microreactor was collected and then stirred under the nitrogen atmosphere for 90 minutes) than in Example 4 (in which the mixed solution was not stirred under the nitrogen atmosphere).

Therefore, it is suggested that the platinum mass activity of the core-shell catalyst is increased by stirring, under the inert atmosphere such as nitrogen gas, the collected mixed solution obtained by mixing the copper-coated palladium particle dispersion and the platinum ion-containing solution in the microreactor.

[Comparison of Substitution Reaction Time]

From a comparison between Examples 1 to 14 and Comparative Examples 1 to 4, as shown in Table 1, it is clear that the time needed by all the copper-coated palladium particle dispersion (40 L) to pass through the junction in the microreactor is 30 to 220 minutes in Examples 1 to 14, and the time needed for the substitution reaction is 120 to 310 minutes in Examples 1 to 14, even after the time needed for the stirring of the collected mixed solution under the nitrogen atmosphere (that is, 90 minutes in Examples 1 to 3 and 5 to 14) is added thereto, and the time needed for the substitution reaction in Examples 1 to 14 is shorter than the time needed for the substitution reaction by the dropping method in Comparative Examples 1 to 3 (1690 minutes) and Comparative Example 4 (2000 minutes).

[Comparison of Pressure]

As shown in Table 1, from a comparison between Examples 2 and 5 to 8, it is clear that the platinum mass activity is higher in the case where the copper-coated palladium particle dispersion and the platinum ion-containing solution were mixed in the microreactor under a pressure condition of 25 MPa (Example 2), 50 MPa (Example 6), 100 MPa (Example 7) or 200 MPa (Example 8) than in the case where they were mixed at 5 MPa (Example 5).

Therefore, it is suggested that the platinum mass activity of the core-shell catalyst is increased by increasing the pressure at the time of mixing the copper-coated palladium particle dispersion and the platinum ion-containing solution in the microreactor.

[Effects of Citric Acid]

As shown in Table 1, from a comparison between Example 1 and Comparative Examples 2 to 4, it is clear that the platinum mass activity is higher in Example 1 (in which the platinum ion-containing solution that was not mixed with the citric acid was used) than in Comparative Examples 2 to 4 (in which the platinum ion-containing solution mixed with the citric acid was used).

Therefore, it is clear that the core-shell catalyst with higher activity than that obtained by the dropping method, is obtained by the present invention, without the addition of the citric acid to the platinum ion-containing solution.

Meanwhile, as shown in Table 1, from a comparison between Example 1 and Examples 2, 3 and 9 to 14, it is clear that in the case where the citric acid ion concentration of the mixed solution obtained by mixing the copper-coated palladium particle dispersion and the platinum ion-containing solution is set to 0.05 mol/L (Example 14), 0.2 mol/L (Example 13), 0.4 mol/L (Example 11), 0.8 mol/L (Example 12), 1 mol/L (Examples 2, 3 and 10) or 2 mol/L (Example 9) with respect to a Pd/C mass concentration of 1 g/L, the platinum mass activity is comparable to or more than Example 1 in which the platinum ion-containing solution not mixed with the citric acid was used.

Therefore, it is suggested that the platinum mass activity of the core-shell catalyst is increased by the use of the platinum ion-containing solution mixed with the predetermined amount of citric acid.

[Effects of Microreactor]

As shown in Table 1, from a comparison between Examples 9 to 14, it is clear that in the copper-coated palladium-containing particle dispersion preparing step, the dispersion was prepared at a Pd/C mass concentration of 0.5 g/L (Example 9), 1 g/L (Example 10), 2.5 g/L (Examples 11 to 13) and 5 g/L (Example 14) and in the platinum ion-containing solution preparing step, the citric acid ion concentration of the platinum ion-containing solution was set to 2 mol/L and the solution was prepared at a platinum ion concentration of 0.001 mol/L (Example 9), 0.002 mol/L (Example 10), 0.0025 mol/L (Example 12), 0.005 mol/L (Example 11), 0.01 mol/L (Example 13) and 0.04 mol/L (Example 14); however, by the use of the microreactor, the volume ratio of the copper-coated palladium-containing particle dispersion and the platinum ion-containing solution can be controlled so that the molar amounts of the palladium and platinum in the mixed solution is in an optimal range for the substitution reaction of the copper with the platinum; therefore, the core-shell catalysts with comparable platinum mass activities could be produced, without a dependence on the mass concentration of the copper-coated palladium-containing particles in the copper-coated palladium-containing particle dispersion, the volume of the copper-coated palladium-containing particle dispersion, the platinum ion concentration of the platinum ion-containing solution, and the volume of the platinum ion-containing solution.

REFERENCE SIGNS LIST

10. First supply flow path
20. Second supply flow path
30, 40. Pump
50. Junction (small space)
60. Drain flow path
100. Microreactor

The invention claimed is:
1. A method for producing a core-shell catalyst comprising a core containing palladium and a shell containing platinum and coating the core, the method comprising:
 a step of preparing a copper-coated palladium-containing particle dispersion in which copper-coated palladium-containing particles are dispersed, the particles being palladium-containing particles coated with copper;
 a step of preparing a platinum ion-containing solution; and
 a substitution step of forming the shell by substituting the copper on the copper-coated palladium-containing particle surface with platinum by mixing the copper- coated palladium-containing particle dispersion and the platinum ion-containing solution in a microreactor.

2. The method for producing the core-shell catalyst according to claim 1, wherein the palladium-containing particles are supported on a support.

3. The method for producing the core-shell catalyst according to claim 1, wherein the platinum ion-containing solution comprises a reaction inhibitor for inhibiting a substitution reaction of platinum ions with the copper and the platinum.

4. The method for producing the core-shell catalyst according to claim 3, wherein the reaction inhibitor is at least one selected from the group consisting of citric acid, sodium citrate and potassium citrate.

5. The method for producing the core-shell catalyst according to claim 4, wherein a citric acid ion concentration of the platinum ion-containing solution is in a range of 0.5 to 2 mol/L.

6. The method for producing the core-shell catalyst according to claim 1, wherein the mixing in the substitution step is carried out under a pressure condition of 5 to 200 MPa.

7. A method for producing a core-shell catalyst comprising a core containing palladium and a shell containing platinum and coating the core, the method comprising:
a step of preparing a copper-coated palladium-containing particle dispersion in which copper-coated palladium-containing particles are dispersed, the particles being palladium-containing particles coated with copper;
a step of preparing a platinum ion-containing solution; and
a substitution step of forming the shell by substituting the copper on the copper-coated palladium-containing particle surface with platinum by mixing the copper-coated palladium-containing particle dispersion and the platinum ion-containing solution in a microreactor and stirring the mixed solution thus obtained in nitrogen atmosphere after the mixing.

8. The method for producing the core-shell catalyst according to claim 7, wherein the mixing in the substitution step is carried out under a pressure condition of 25 to 200 MPa inside a junction of the microreactor.

9. A method for producing a core-shell catalyst comprising a core containing palladium and a shell containing platinum and coating the core, the method comprising:
a step of preparing a copper-coated palladium-containing particle dispersion in which copper-coated palladium-containing particles are dispersed, the particles being palladium-containing particles coated with copper;
a step of preparing a platinum ion-containing solution; and
a substitution step of forming the shell by substituting the copper on the copper-coated palladium-containing particle surface with platinum by mixing the copper-coated palladium-containing particle dispersion and the platinum ion-containing solution in a microreactor,
wherein the platinum ion-containing solution comprises at least one selected from the group consisting of citric acid, sodium citrate and potassium citrate, and
wherein a citric acid ion concentration in the mixture obtained by mixing the copper-coated palladium particle dispersion and the platinum ion-containing solution is 0.05 to 2 mol/L with respect to a mass concentration of the copper-coated palladium-containing particles of 1 g/L.

10. The method for producing a core-shell catalyst according to claim 9, wherein the citric acid ion concentration in the mixture obtained by mixing the copper-coated palladium particle dispersion and the platinum ion-containing solution is more than 0.4 mol/L and less than 2 mol/L with respect to a mass concentration of the copper-coated palladium-containing particles of 1 g/L.

* * * * *